(12) United States Patent
Hopkins, III et al.

(10) Patent No.: US 11,715,160 B1
(45) Date of Patent: *Aug. 1, 2023

(54) SYSTEMS AND METHODS FOR USING UNMANNED AERIAL VEHICLES

(71) Applicant: United Services Automobile Association (USAA), San Antonio, TX (US)

(72) Inventors: John Chandler Hopkins, III, San Antonio, TX (US); Michael Patrick Bueche', Jr., San Antonio, TX (US); Andre Rene Buentello, San Antonio, TX (US); James Philip Hillman, San Antonio, TX (US); Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 305 days.

This patent is subject to a terminal disclaimer.

(21) Appl. No.: 17/014,436

(22) Filed: Sep. 8, 2020

Related U.S. Application Data (63) Continuation of application No. 13/693,969, filed on Dec. 4, 2012, now Pat. No. 10,896,468, which is a
(Continued)

(51) Int. Cl.
*G06Q 40/08* (2012.01)

(52) U.S. Cl.
CPC .................................... *G06Q 40/08* (2013.01)

(58) Field of Classification Search
CPC ...................................................... G06Q 40/08
See application file for complete search history.

(56) References Cited

U.S. PATENT DOCUMENTS

| 5,351,311 A | 9/1994 | Rogers et al. |
| 5,420,589 A | 5/1995 | Wells et al. |

(Continued)

FOREIGN PATENT DOCUMENTS

| CA | 2429767 A1 | 6/2004 |
| WO | 2002073367 | 9/2002 |

OTHER PUBLICATIONS

Benedetto, A, et al., "Ground Penetrating Radar Signal Processing for Road Monitoring and Damage Detection," Seventh International Symposium on Signal Processing and its Applications, 2003 Proceedings. (vol. 1, pp. 325-328) (Jan. 1, 2003). (Year: 2003).*

(Continued)

*Primary Examiner* — Elizabeth H Rosen
(74) *Attorney, Agent, or Firm* — BakerHostetler (57) ABSTRACT

Systems and methods to process overhead imagery received from overhead image sources are described herein. Examples include accessing an aerial image including a property, determining an owner of the property, determining whether the owner of the property is eligible to be a member of a financial institution, determining whether the owner of the property has property insurance with the financial institution for the property type of the property in the aerial image, and presenting an offer for insurance to insure the property in the aerial image when the owner is determined to be eligible for the financial institution and does not already have insurance with the financial institution. Examples include accessing an aerial image of properties, determining damage estimates, and reserving resources to repair the properties based on the damage estimates. Examples include receiving information describing property damage, determining a cause, and based on the cause, conditionally deploying a unmanned aerial vehicle to perform insurance adjustment activities.

7 Claims, 6 Drawing Sheets

Related U.S. Application Data continuation of application No. 13/219,494, filed on Aug. 26, 2011, now Pat. No. 8,346,578, which is a continuation-in-part of application No. 11/762,707, filed on Jun. 13, 2007, now Pat. No. 8,229,768.

(56) References Cited

U.S. PATENT DOCUMENTS

| | | | |
|---|---|---|---|
| 5,575,438 | A | 11/1996 | McGonigle et al. |
| 5,897,619 | A * | 4/1999 | Hargrove, Jr. ........ G06Q 30/018 705/317 |
| 6,067,340 | A | 5/2000 | Eppstein et al. |
| 6,118,885 | A | 9/2000 | Wadsworth et al. |
| 6,281,970 | B1 | 8/2001 | Williams et al. |
| 6,364,026 | B1 | 4/2002 | Doshay |
| 6,392,213 | B1 | 5/2002 | Martorana et al. |
| 6,671,582 | B1 | 12/2003 | Hanley |
| 7,218,267 | B1 | 5/2007 | Weil |
| 7,502,490 | B2 | 3/2009 | Rhoads et al. |
| 8,229,768 | B1 | 7/2012 | Hopkins, III |
| 9,389,314 | B1 | 7/2016 | Boyer et al. |
| 2002/0041328 | A1* | 4/2002 | LeCompte ........... G01C 11/025 348/144 |
| 2002/0095317 | A1 | 7/2002 | McCabe |
| 2002/0120475 | A1 | 8/2002 | Morimoto |
| 2002/0169664 | A1 | 11/2002 | Walker et al. |
| 2003/0033242 | A1 | 2/2003 | Lynch et al. |
| 2003/0093304 | A1 | 5/2003 | Keller et al. |
| 2003/0210168 | A1 | 11/2003 | Ruszkowski |
| 2004/0128613 | A1 | 7/2004 | Sinisi |
| 2004/0167861 | A1 | 8/2004 | Hedley |
| 2004/0177373 | A1 | 9/2004 | Kawabe et al. |
| 2004/0186753 | A1 | 9/2004 | Kim et al. |
| 2005/0251427 | A1* | 11/2005 | Dorai ..................... G06Q 40/08 705/4 |
| 2005/0267657 | A1 | 12/2005 | Devdhar |
| 2005/0267837 | A1 | 12/2005 | White |
| 2006/0055400 | A1 | 3/2006 | Safai et al. |
| 2006/0218018 | A1 | 9/2006 | Schmitt |
| 2007/0136076 | A1 | 6/2007 | Goldberg et al. |
| 2009/0138290 | A1 | 5/2009 | Holden |
| 2009/0216552 | A1 | 8/2009 | Watrous |
| 2009/0256741 | A1 | 10/2009 | Shibayama et al. |
| 2009/0265193 | A1* | 10/2009 | Collins .............. G06Q 30/0185 901/46 |
| 2009/0279734 | A1 | 11/2009 | Brown |
| 2010/0198652 | A1 | 8/2010 | Spanton, Jr. et al. |
| 2011/0029331 | A1 | 2/2011 | Parker et al. |

OTHER PUBLICATIONS

"U.S. Appl. No. 13/219,494, Non Final Office Action dated May 2, 2012", 14 pgs.
"U.S. Appl. No. 13/219,494, Notice of Allowance dated Aug. 31, 2012", 7 pgs.
"U.S. Appl. No. 13/219,494, Response filed Aug. 2, 2012 to Non Final Office Action dated May 2, 2012", 9 pqs.
"U.S. Appl. No. 13/219,494, Restriction Requirements dated Jan. 23, 2012", 4 pgs.
"Satellite Images Used to Detect Crop Insurance Fraud", [online]. Jan. 12, 2006, Insurance Journal. [retrieved on Jun. 13, 2007]. Retrieved from the Internet: <URL: http://www.insurancejournal.com/news/midwest/2006/01/12/64117.htm>, 3 pqs.
"UW Students Research Satellite Imagery to Map Northwest Tree Fruit and Grapes", [online]. Jul. 31, 2006, published by Washington Wine Industry Foundation. Retrieved from the Internet: <URL: http://www.washinqtonwinefoundation.orq/index.php?paqe id=12 &newsletter id=32>, 3 pqs.
Allen, "Weather: No business like snow business: Katie Allen looks at why Farmers and Stock Exchanges are prepared to Pay Big money for the most accurate forecasts," The Guardian, London UK, May 21, 2007, p. 2. (3 pages total).
Boating Accident Investigation, Marine Surveys, Infrared Imaging, 2004.
Botts, H., "Computer Modeling Tames Super-Cat Hurricane Risk", White Paper, Proxix Solutions, Inc., (2007), 12 pgs.
Clifton, C., "Privacy, Security, and Data Mining—How Do We Mine Data When We Can't Even Look at It?", ECML/PKDD-2002 Tutorial, (Aug. 20, 2002, Helsinki, Finland), (2002), 56 pqs.
Cummins et al., "The Basis Risk of Catastrophic-Loss Index Securities," The Wharton School Finanical Institutions Center, University of Philadelphia, May 24, 2000, 65 pages total.
H.C. Chang, L. Ge, C. Rizas; School of Surveying and Spatial Information Systems, The University of New South Wales, Sydney, NSW 2052, Australia. (Year: 2005).
Photogrammetric Engineering and Remote Sensing, vol. 53, No. 4, Apr. 1987, pp. 405-413 (Year: 1987).
Polstein, "What to Do About Catastrophic Loss: Cats and Other Felines," Jan. 2006; retrieved from the Internet: <http://www.irmi.com/expert/articles/2006/polstein01.aspx>, 3 pages total.
Redstone surveillance planes to help assess storm damage; Thursday, Sep. 8, 2005.
Ribarsky, W., et al., "From Urban Terrain Models to Visible Cities", IEEE Computer Graphics and Applications, (Jul./Aug. 2002), 2-7 pgs.
Roeder, L. W., "The Global Disaster Information Network", [online], Oct./Nov. 1999, Bulletin of the American Society for Information Science, [retrieved on Jun. 13, 2007]. Retrieved from the Internet: <URL: http://www.asis.orq/Bulletin/Oct-99/roeder.html>, 5 pqs.
Schoenung, Susan, et al., "UAV Over-the-Horizon Disaster Management Demonstration Projects", [online] NASA Ames Research Center, Feb. 2000 [retrieved on Feb. 1, 2011]. Retrieved from the Internet: <URL: http://geo.arc.nasa.gov/sge/UAVFiRE/whitepaper.pdf>, 18 pqs.
Seol, "Interests grows in securitizing life policies," National Underwriter, Nov. 5, 2001; 105(45): 45 pgs.
UAV Applications: Fire Management—Project Overview; Oct. 25, 2005.
UAV Commercial Applications; Jun. 14, 2006 (herein after NPL 1 ).
"U.S. Insurance Firms Have Eyes in the Sky," Sault Star (Sep. 27, 2004), p. A.1.Fro.
Garrett, Alex. "Rain Stops Foul Play by Claimants Bright Outlook for Insurers as Met Offers Data, writes Alex Garrett," The Observer (May 12, 1996), p. 009.

* cited by examiner

SYSTEMS AND METHODS FOR USING UNMANNED AERIAL VEHICLES

RELATED APPLICATIONS

This application is a continuation of U.S. patent application Ser. No. 13/693,969, filed Dec. 4, 2012, which is a continuation of U.S. patent application Ser. No. 13/219,494, filed Aug. 26, 2011, which issued on Jan. 1, 2013 as U.S. Pat. No. 8,346,578, which is a continuation-in-part of U.S. patent application Ser. No. 11/762,707, filed Jun. 13, 2007, which issued on Jul. 24, 2012 as U.S. Pat. No. 8,229,768 the contents of which are incorporated herein by reference in its entirety.

This disclosure is also related to U.S. patent application Ser. No. 11/762,710, entitled "SYSTEMS AND METHODS FOR PROCESSING OVERHEAD IMAGERY," and U.S. patent application Ser. No. 11/762,713, entitled "SYSTEMS AND METHODS FOR PROCESSING OVERHEAD IMAGERY."

TECHNICAL FIELD

This application relates to systems and methods that receive and process overhead imagery and more particularly to systems and methods that receive and process overhead imagery as an input to risk assessment systems.

BACKGROUND

Customers demand more of the products and services they use than ever before. They insist that the companies they deal with on a regular basis provide them greater and greater levels of accuracy and more tailored service offerings. Companies configure and operate ever increasing numbers of computer systems to achieve this.

Using sources of information that have traditionally been unavailable when service these customers is now expected. For instance, telemetry data from vehicles operated by a customer could be used to derive a risk that the customer presents in their auto insurance policy. In this manner, the policy could be tailored to an individual and not generalized over a grouping of customers.

SUMMARY

In an embodiment, a method of processing overhead imagery includes receiving one or more overhead images from at least one image source, detecting one or more features on a property, deriving business information using the one or more features and providing the business information. In a further embodiment, the business information may be used for either determining premiums for an insurance policy on the property, or for adjusting an insurance claim to compensate for damage experienced on the property.

In another embodiment, a method of processing overhead imagery includes receiving one or more overhead images which contain a number of properties, correlating the one or more images with one or more land maps, parsing the properties into collections of individual properties, determining values for each of the properties and aggregating the values. In a further embodiment, a weather event footprint may be forecast and investment decisions made using the aggregated values.

In another embodiment, an apparatus to process overhead imagery includes an overhead image module to receive and positionally correlate overhead images, and an image analyzer to determine one or more features on a property. In further embodiments, the one or more features may include risks to a structure on the property, or structural damage to a structure on the property.

In another embodiment, a method includes accessing an aerial image including a property, determining an owner of the property, determining whether the owner of the property is eligible to be a member of a financial institution, determining whether the owner of the property has property insurance with the financial institution for the property type of the property in the aerial image, and presenting to the owner, an offer for property insurance to insure the property in the aerial image when the owner is determined to be eligible for the financial institution and when the owner does not have property insurance with the financial institution.

In another embodiment, a method includes obtaining an aerial image of a plurality of properties, determining a plurality of damage estimates for the plurality of properties, and reserving resources to repair the plurality of properties based on the plurality of damage estimates.

In another embodiment, a method includes receiving information describing property damage to an insured property, determining a cause of the property damage, and based on the cause of the property damage, conditionally deploying a unmanned aerial vehicle to perform insurance adjustment activities with regard to the insured property.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

Figure 1:
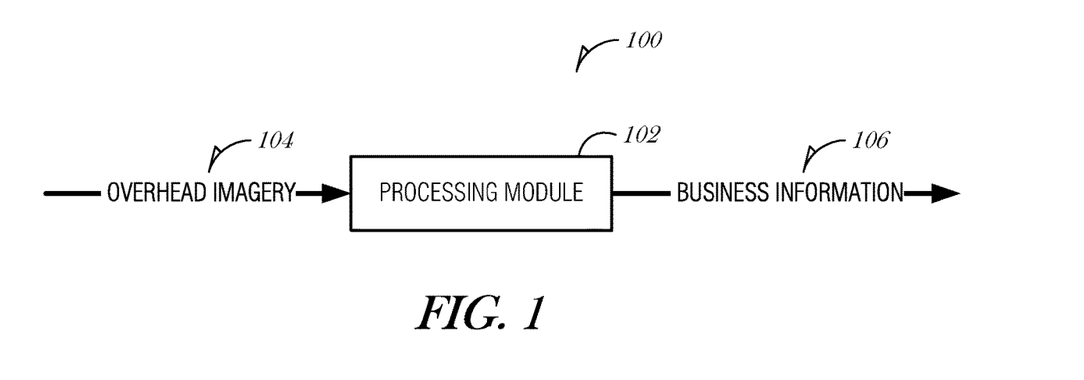
FIG. 1 shows a high-level block diagram of a system for processing overhead imagery, in accordance with an example embodiment.

FIG. 1 shows a high-level block diagram of a system for processing overhead imagery, in accordance with an example embodiment. The system 100 includes one or more processing modules 102 which receive overhead imagery 104. Following one or more operations performed by the processing modules 102, business information 106 is output. The business information 106 may include, without limitation, insurance underwriting data or claim adjustment data. Examples of business information 106 are further described below with reference to FIGS. 2A-2C.

In an embodiment, the processing modules 102 are operated when a consumer requests an insurance policy, which may include, in one example, a property insurance policy. The insurance policy is a contract between the consumer and an insurance company where the consumer agrees to pay a pre-arranged periodic premium, and the insurance company agrees to reimburse the consumer for a partial or total loss of the property. For instance, a homeowner's policy provides the consumer piece of mind that they will be able to rebuild their home in the event of a catastrophic loss. When setting the premium, the insurance company attempts to strike a balance between a competitive price and the amount of money needed to cover the potential loss. This is done over the aggregate of customers. If a premium is too high, it may drive away potential customers. If the premium is too low, the company may not be able to cover all of the losses in a year, possibly leading to bankruptcy. The premium for a specific consumer is a measure of the risk that some loss may occur on that property over the life of the policy.

Any number of information sources may be used to determine that risk and may include, without limitation, structure value, value of contents within the house, proximity to natural hazards (such as waterways), presence of physical hazards to people (such as a swimming pool), personal consumer risk (as measured by a credit score, in some examples, which can provide some measure of the fraud risk presented by the consumer) and the like. Typically, when quoting an insurance policy, however, a visit to the property itself is never made by the representative of the insurance company. This may lead to not factoring in any variety of other information that could lead to an increased or decreased risk to the property. One example of such information is the presence of large trees in close physical proximity to the structure. These trees, if felled during a storm, could destroy the entire house, or at least do damage to the homes. Other information may include proximity to a well travelled road. The system 100 described here can use, in one example, information obtained from overhead imagery to ascertain one or more risks to the property and provide that information to an underwriting engine.

In another embodiment, the processing modules 102 are operated when damage to an insured property occurs. This may be following a representation from the insured that damage has occurred to the property. Alternatively, the system 100 may be used following a weather event, such as a hail storm, or flood, though the present application has equal applicability to any event that may cause damage to a structure. In such an arrangement, the operations would occur without consumer initiation. For instance, the insurance company receives some indication of an event that possibly caused damage to insured properties. The processing modules 102 would be operated using overhead imagery of the insured property to determine if damage had occurred to the insured property. If damage had occurred, the insured could be contacted, or the information stored without contacting the insured.

As used herein, overhead imagery includes any images that were generated from an overhead source. This may include images received from a satellite, or an aircraft. In the latter example, the aircraft may be manned or unmanned. Unmanned aircraft, also known as unmanned aerial vehicles (UAV), drones, or flying remote-controlled robots, may be equipped with various sensors, monitors, and other equipment to provide services, such as home inspection, accident response, or support during or after a catastrophic event. The use of an unmanned aircraft may provide the advantage of safer and possibly more complete data acquisition. For example, an unmanned vehicle may be maneuvered to obtain images from a perspective that would be unsafe or impractical for a human inspector to obtain.

In either manned or unmanned configurations, the images received may include visual as well as non-visual information. For instance, portions of the electromagnetic spectrum may yield information about structural damage which are not discernable visually, such as measuring the light absorption of a particular roof to determine if the roof has had hail damage. Other possible risks to the insured property may be shown by ground penetrating radar, such as sinkholes in proximity to the property. The images received may be passive images or active images. One example of an active image is a radar scan of the ground or property. Furthermore, images may be obtained from a video feed received from the overhead source.

Images may also be obtained using other mechanisms, including balloons (both manned and unmanned), blimps, rockets, kites, or pole-mounted cameras, for example.

Systems

Figure 2A:
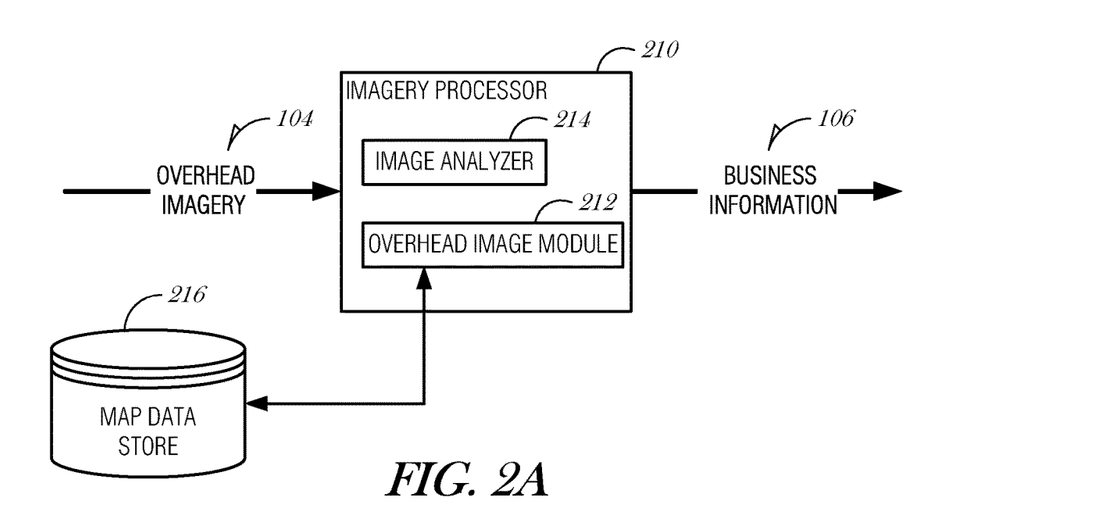
FIG. 2A shows a more detailed block diagram of an apparatus for processing and analyzing images, in accordance with an example embodiment.

FIG. 2A shows a more detailed block diagram of an apparatus for processing and analyzing images, in accordance with an example embodiment. The imagery processor 210 includes an overhead image module 212 and an image analyzer 214. The imagery processor 210 receives overhead imagery 104 from one or more image sources, which may include a plurality of overhead images. The image sources may include, as stated above, satellites or aircraft. The imagery processor 210 outputs business information 106 as discussed above. The overhead image module 212 may additionally be coupled to a map data store 216.

In an embodiment, the overhead image module 212 is configured to receive images from the one or more overhead image sources and to positionally correlate the images. Positionally correlating includes defining the location of the images in a three-dimensional space, such as latitude, longitude and elevation. The positionally correlated images can be associated with a property at that location. Positionally correlate may include receiving images from a source with an inconsistent path and combining those images with images received from a source with a more consistent path.

One example of this are aircraft sources. Aircraft may have their position altered by air turbulence, or other means. This creates inconsistency when determining the exact locations of the images with respect to properties within them. However, aircraft flown over an area have an advantage over satellites in that the aircraft may have sensor packages that can be exchanged quickly, such as exchanging a camera that only operates in the visible spectrum for one that operates in the non-visible spectrum, such as infrared. To compensate for the possible inconsistency of an aircraft source, the images can be correlated with satellite imagery which is traditionally more accurate. However, other methods of correlating the images received may be used, such as through human image analysis, or through electronic means. This may be done by locating specific landmarks in the received image and correlating the image thereby.

In a further embodiment, the overhead image module 212 utilizes a map data store 216 to positionally correlate the images. This may be done through any suitable means, though one example of such use may include accurately locating landmarks in an area that can be readily identified in a received image. This could include physical landmarks, such as rivers, shorelines, mountain peaks, and the like. It could also include man-made landmarks such as distinctive buildings, roads, bridges, and the like.

In an embodiment, the image analyzer 214 is configured to receive the correlated images and to determine one or more features on the property using the correlated images. These features may include structures on the property, risks to the structures on the property, substructures of the structures on the property (such as roof, chimneys, garages, additions, and the like), or landscaping on the property (including recreational features such as a swimming pool, fencing, and the like). These are just some examples of features on a property and is not meant to be an exhaustive list. Any discernible feature on a property that could be used to value the property, determine a risk to structures, or determine incurred damage to the property are considered to be within the scope of the present discussion.

Figure 2B:
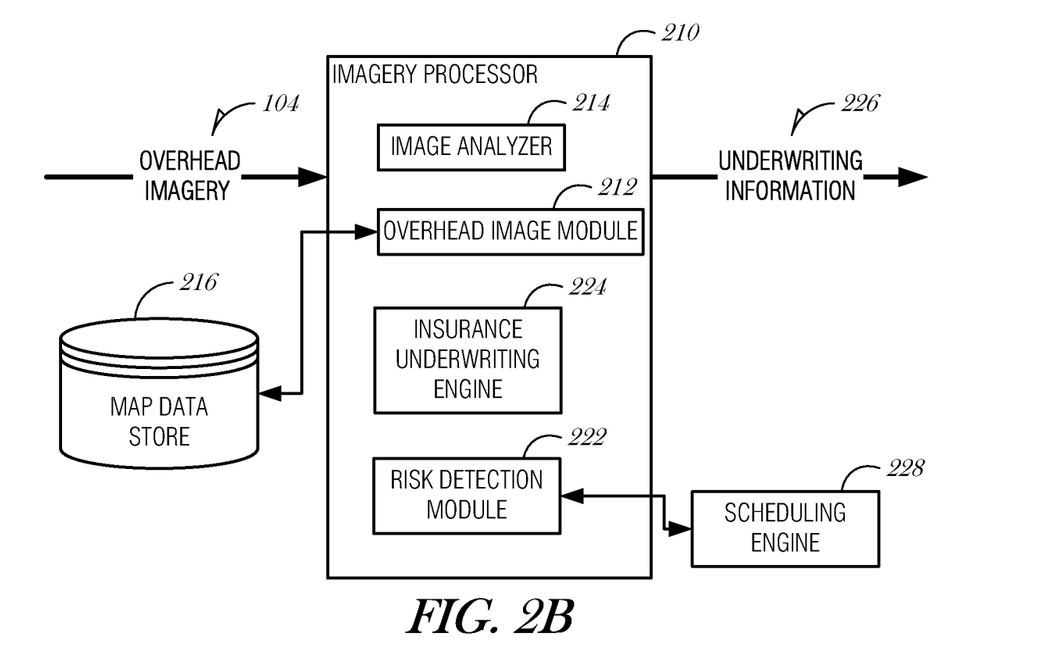
FIG. 2B shows a block diagram of an apparatus for processing and using information obtained from analyzed images, in accordance with an example embodiment.

FIG. 2B shows a block diagram of an apparatus for processing and using information obtained from analyzed images, in accordance with an example embodiment. The imagery processor 210 discussed above receives overhead imagery 104 and outputs business information 106 after performing one or more operations as discussed herein. One aspect of business information 106 may be insurance underwriting information 220. In such an example, the imagery processor 210 may additionally include a risk detection engine 222 and an insurance underwriting engine 224.

In an embodiment, the risk detection engine 222 is configured to detect one or more risks to a structure on the property. As discussed above, risks to a structure are just one aspect of features that are determined by the image analyzer.

In an embodiment, the insurance underwriting engine 224 is configured to derive an insurance premium for a property using at least one or more risks to the property. These one or more risks may be received from the risk detection engine. Additional risks associated with the property may be supplied to the insurance underwriting engine 224 by an insurance agent. The insurance underwriting engine 224 may, by using additional information and systems, generate a quote for the insurance policy. Alternatively, the insurance underwriting engine 224, as discussed above can supply the derived premium to other systems for final underwriting of a property insurance policy. In either case, the output of the apparatus shown in FIG. 2B is collectively known as underwriting information 226 and may include information fully suitable to underwriting an insurance policy, or merely a premium for the insurance policy given the risks to the property.

In a further embodiment, the apparatus may additionally include a scheduling engine 228 coupled to the risk detection engine 222 that is configured to send instructions periodically to the risk detection engine 222 that cause the risk detection engine 222 to perform operations to determine additional risks. Scheduling may be configured to cause the apparatus to operate on a quarterly, semi-annual, or annual basis. These operations occur without being initiated by an insured or potential insured party. Through these operations, changes to the property can be ascertained and the policy quoted properly. This may include determining risks that did not exist when the policy was first quoted, or during the last risk detection operation. This risk detection operation may be performed periodically, but can be performed whenever needed, such as in response to an event being detected. One event may be a large weather event that may have felled trees in proximity to the property. Another event may be notification of a highway construction project adjacent to an insured property.

Figure 2C:
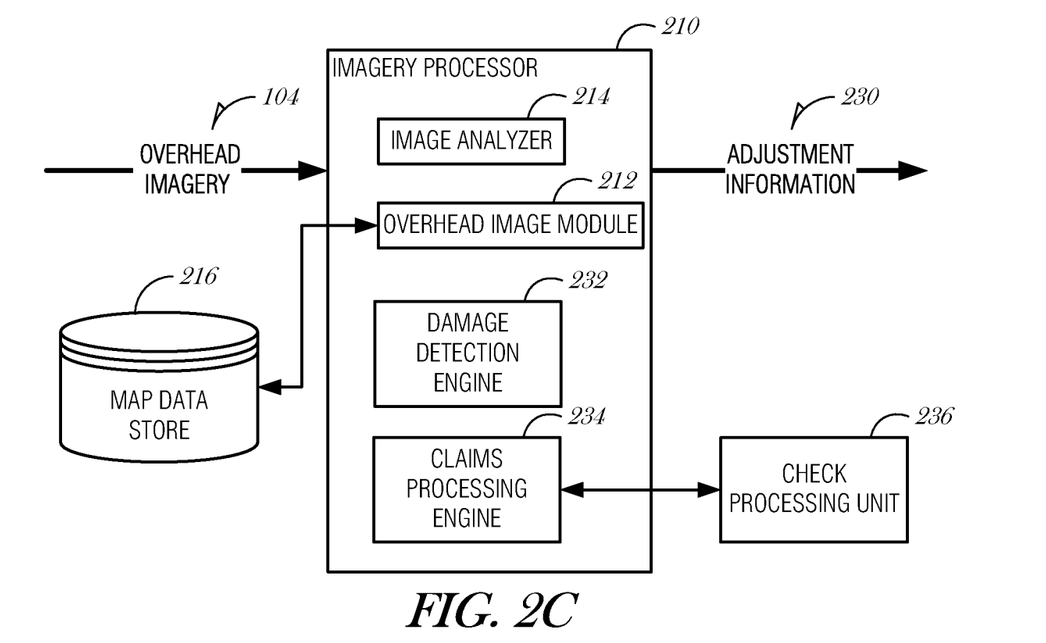
FIG. 2C shows a block diagram of an apparatus for processing and using information obtained from analyzed images, in accordance with an example embodiment.

FIG. 2C shows a block diagram of an apparatus for processing and using information obtained from analyzed images, in accordance with an example embodiment. The imagery processor 210 discussed above receives overhead imagery 104 and outputs business information 106 after performing one or more operations as discussed herein. One aspect of business information 106 may be adjustment information 230. As used herein, adjustment information 230 includes any information that can be used to determine the amount of damage to an insured property or to a insured structure. One example of this may be the amount of repair required to complete a full repair of a roof after a hailstorm. In these examples, the imagery processor 210 includes the overhead image module 212 and the image analyzer 214 as discussed above with respect to FIG. 2A. The imagery processor 210 additionally includes, in this example, a damage detection module 232 and a claims processing engine 234.

In an embodiment, the damage detection module 232 is configured to detect structural damage using the received images using either visual, non-visual information, or both. This can be done through any suitable means intended to detect a change in the structural composition of the insured property. This may include a difference in the light absorption in a roof (possibly indicative of damage to the roof), in one example. Any number of image analysis techniques may be used to detect damage. One aspect of detecting damage may also include comparing baseline images (such as taken when the property was first insured, or some time prior to a potentially damaging event) to a current image and noting the differences between the two. Any difference could be considered damage to the property.

In an embodiment, the claims processing engine 234 takes the structural damage detected by the damage detection engine 232 and uses that information to process an insurance claim. This may include quantifying the damage and determining the maximum amount of coverage given the policy insuring the property. It may additionally include sending instructions to a check processing unit 236 so that a check, or other monetary device, can be issued to the insured to repair, or cover, the damage. In these example, the claims processing engine 234 may operate without the intervention of a claims processing agent. Alternatively, the claims processing engine 234 may process an insurance claim by making a preliminary determination as to the amount of damage to the structure and provide that information to a claims processing agent. The claims processing agent, in this example, can then perform other operations directed towards the satisfaction of that insurance claim. This may be advantageous in situations where only one aspect of damage to a property is ascertainable to the image analyzer. In either case, the imagery processor 210 in this example outputs adjustment information that can be used for the satisfaction of an insurance claim made by the insured.

In an alternate embodiment, the apparatus depicted in FIG. 2C can be used without initiation by the insured or a claims processing agent. One example of this is following a large weather event, such as a hail storm, tornado, or hurricane. The operator of the apparatus could choose to dispatch an image collection device (e.g., image sources) to the affected area and preliminarily determine damage to insured properties in that area. Claims processing agents can then begin to contact the insured and work with them to resolve the potential insurance claim. In an embodiment, a claims processing agent may interact with an insured via an unmanned aerial vehicle. This may be advantageous in situations where other communications are temporarily unavailable, such as loss of cellular service due to an earthquake. An unmanned aerial vehicle equipped with satellite communications may provide a communication link for the insured to obtain emergency assistance or begin claims processing. A display screen on the unmanned aerial vehicle may provide a graphical user interface that may include a video conferencing interface.

In an embodiment, preliminary determinations of damage are used to plan and arrange remedial activities, such as construction contracts. Thus, for example, damage estimates are used to determine one or more possible construction projects. Each of the construction projects may be published with a request for bid. In an embodiment, the requests for bids are conducted with a reverse bidding mechanism. For example, damage to a building may result in an estimated cost of repair of $15,000. The insurance company approves $15,000 for the repairs and then places an offer to one or more builders to repair the building for the approved $15,000.

The first builder to accept may be granted the building contract. An extension to this mechanism may include a bidding mechanism between builders to determine which builder is willing to bid the lowest, with $15,000 being the starting bid in this example.

Alternatively, the information can be stored and retrieved when the insured calls a claims processing agent, which can lead to a quicker resolution to the problem, as the agent is already preliminarily apprised of the situation. As the operator of the apparatus is dispatching resources to the area to determine damage to properties insured by them, or a company hiring the operator, other uses of the overhead imagery and damage information can be made. One example of this is future marketing information where the operator notes properties with large damage amounts and targets future marketing towards them. Another possible use is input into an investment decision engine to determine the potential financial liability to company providing insurance to properties in the area.

Methods

FIGS. 3-8 generally describe processes for insurance operations. In some embodiments, processes are implemented in computer systems or as instructions on computer-readable media.

Figure 3:
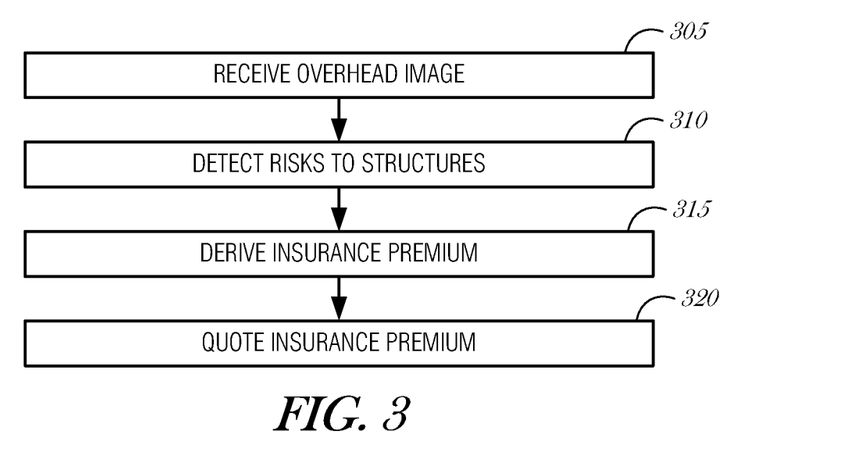
FIG. 3 shows a flowchart of a method for determining risk, in accordance with an example embodiment.

FIG. 3 shows a flowchart of a method for determining risk, in accordance with an example embodiment. In an embodiment, the operations depicted in FIG. 3 are carried out by an apparatus such as that depicted above in FIG. 2B.

At block 305, an overhead image is received. This may be from any number of overhead image sources, such as aircraft or satellite. Either of those sources may be in constant operation or may be dispatched specifically for the purpose of determining risks to structures on the property. As discussed above, the proper determination of a premium for an insurance policy requires an accurate determination of the risk to the structure on the property. Too much erroneous risk, and the insurance company may drive the potential customer away with a higher premium. An erroneous lack of risk may result in a situation where the insurance company loses money, as it would not have enough money to cover potential losses. Risks to an insured property are varied and may include physical risks, such as a tree falling on the house, presence of a swimming pool without adequate barriers, proximity of a well-traveled roadway, and the like. The risks may also be non-physical, such as the propensity of the insured to not pay their premiums, the propensity of the insured to submit fraudulent claims, and the like. The aggregate of that risk information is used to properly derive an insurance premium. The discussion herein relates specifically to physical risks that are ascertainable through image analysis, but which may be used in conjunction with information about non-physical risks.

At block 310, risks to the structure are detected. Risks are just one type of feature on a property, and as discussed below, may include damage. At block 315 an insurance premium is derived using those risks. Additional information may be used at block 315, such as the non-physical risks. It may also include information about the relative worth of the home, such as determined by public records. Public records, for instance, typically maintain an assessed value for the purposes of proper taxation. This information is publicly available and may be queried without initiation by the potential insured. Alternatively, the potential insured may supply that information to the system, or to an agent.

At block 320, the insurance policy is quoted. This may be without agent interaction, such as solely through a computer interface, which may include a web-enabled online form operable on a computing device operated by the user. Alternatively, such an interaction may be augmented by an interaction with an agent. In one embodiment, the premium is derived at block 315 by automated systems, and the policy is quoted at block 320 by a human agent. Either scenario is equally applicable, though some insurance underwriters may prefer an agent to be involved with the interaction. One determining factor in deciding whether to quote the insurance policy without an agent is the value of the property. For example, if an insured property has a value below a certain threshold, such as $200,000, an agent is not needed, but in cases where the property value exceeds the threshold, the agent's interaction is required.

The method depicted in FIG. 3 may be performed on a scheduled basis, such as quarterly, semi-annually, or annually. Also, the method depicted in FIG. 3 may be performed on demand, for instance, by insurance company personnel, an insured person or party, or another person or entity, such as a tax assessor.

Figure 4:
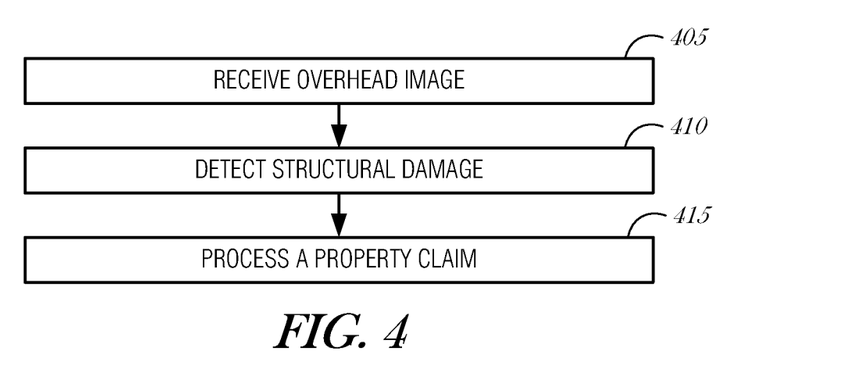
FIG. 4 shows a flowchart of a method of claim adjustment, in accordance with an example embodiment.

FIG. 4 shows a flowchart of a method of claim adjustment, in accordance with an example embodiment. In an embodiment, the operations depicted in FIG. 4 are carried out by an apparatus such as that depicted above in FIG. 2C.

The operations depicted in FIG. 4 are similar to those described above with respect to FIG. 3. In this example, however, the feature on the property of interest is damage to the structure and using that damage information to process an insurance claim. At block 405, one or more overhead images are received from an image source. The image sources may be fixed, but in cases of damage due to some event, such as a weather event, the image source may be dispatched following the event. This may be preferable in some situations as the costs of maintaining an overhead imager could be prohibitive. With respect to satellite's, it may be more cost effective to allocate time on the satellite when needed and not on a continuous basis. However, these are only example arrangements. Continuously operating overhead imagers may also be used.

At block 410, structural damage is detected. This may be done, in one example, by comparing a present image with a stored imaged and noting the difference. For instance, if a structure appears in the stored image and is absent in the present image, it can be inferred that the entire structure has been destroyed. This is an extreme example, but the principle remains the same for any number of damage determinations. The only difference is that in the extreme example, visual information alone could determine the extent of the damage. For less noticeable damages, non-visual information may be used. This may include images capturing the infrared portion of the electromagnetic spectrum. Additionally, penetrating radar may be used to test the integrity of the structure. These are just some examples, and the present application is not limited to any specific method, as any suitable method of image analysis, in either the visual or non-visual spectrum, can be performed to determine the difference between a present image and a stored image.

At block 415, a property claim is processed using at least the detected structural damage. In one embodiment, this may include determining the amount of damage, the amount of coverage, and issuing a check for the repair of the damage up to the covered amount. For example, if the insured has a policy that covers up to $15,000 in roof damage due to hail, and they experience $12,000 in damage, a check for $12,000 could be issued. This may be reduced by some deductible amount as set forth in their insurance policy. However, if the damage was $20,000, they would only receive a check for $15,000. The issuing of a check may be done without agent interaction, and solely by automated systems. However, it may also be done with agent interaction, or with some combination based on the amount of damage.

As discussed above, these operations may occur without the insured ever initiating them. In such an arrangement, the insurance company, or its associated entities, may note an event that may have caused property damage has occurred in an area. The operations depicted in FIG. 4 could be carried out with each of the properties insured. The property claim may be automatically issued but could also be stored for further action. This may include an outbound call by a claims processing agent or could include storing the claim and waiting for the insured to initiate some action.

Figure 5A:
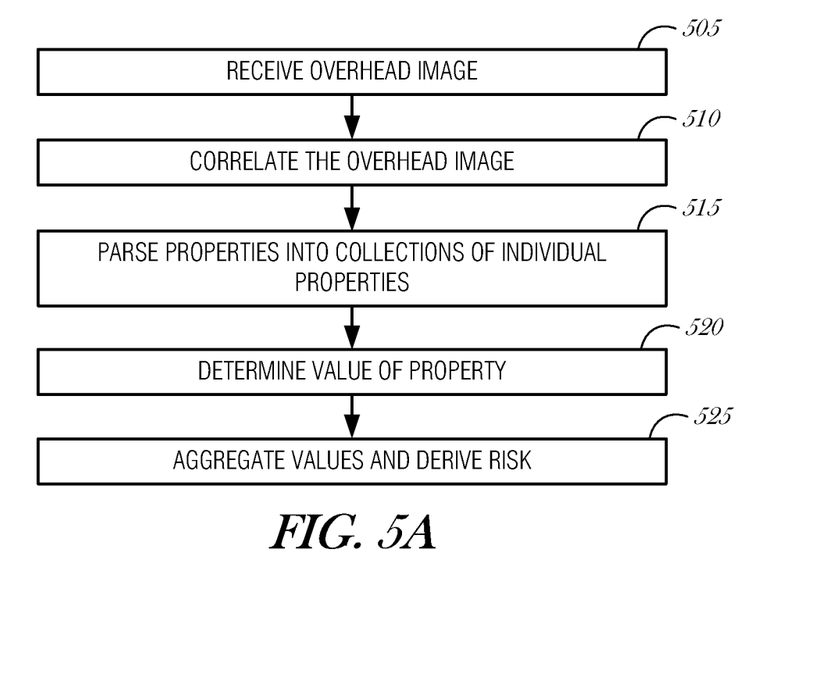
FIG. 5A shows a flowchart of a method of aggregating information for risk analysis, in accordance with an example embodiment.

FIG. 5A shows a flowchart of a method of aggregating information for risk analysis, in accordance with an example embodiment. The operations depicted in FIG. 5A may be carried out on apparatus depicted above in FIG. 2A or 2B, in various examples.

At block 505, overhead images are received into the system. The overhead images contain a plurality of properties, each of which may be insured by an insurance company. Some of the properties in the image may not be insured at all. In such case, for further operations, those properties having no insurance would be discarded from the set of properties. At block 510, the overhead images are correlated with one or more land maps. These land maps may include a plat map, which shows the divisions of a piece of land, specifically the individual properties in a specific area. Correlating the overhead images with a plat map, in one example, provides the ability to determine individual properties contained within the overhead image. The land maps may also include topographic maps (which can provide the risk to the structure of higher water levels) and street maps (which can provide information about how quickly an insured person can remove their belongings prior to the event). The land maps may also include geological maps, which may illustrate fault lines, water run-off, or other geological considerations not typically revealed in other types of maps.

The plurality of properties are parsed at block 515 into a collection of individual properties. The collection of individual properties comprises a subset of properties that carry property insurance underwritten by a single insurance company. Determining which insurance company insures a property may be carried out using public records or purchased lists. As each property that is insured may also carry a lien of some variety on it, the public records with respect to property liens may be used to determine which insurance company insures which property. The operation at block 515 is intended to create subsets of the plurality of properties, each of which represent the at least a portion of, but preferably the entirety of, the properties insured by a single insurance company. In instances where the insurance company for a particular property cannot be determined, the property is categorized into the subset of uninsured properties.

At block 520, each of the properties in a subset of properties is examined as to value. As discussed above, a property has an assessed value for the purposes of taxation, which is a matter of public record. This value can then be used for further valuing operations. At block 525, the values of the properties within the subset of properties are aggregated. This represents the amount of insured liability carried by that insurance company for that area of land. In other words, this represents the total financial liability to the company in the event of a catastrophic loss in that area. In a large geographic sense, this can be used to ascertain the financial risk for a particular company in a region. More specifically, this information can also be used to forecast the potential liability to a particular company or collection of companies for an impending event.

In a further embodiment, the footprint of a weather event may be forecast. This may be through publicly available forecast models, such as promulgated by the National Oceanic and Atmospheric Association (NOAA), or through proprietary forecast models. The footprint of the weather event is a representation of the path of a storm through an area and may include areas of higher winds, or rain. Each of those represent larger risks to properties within the footprint of the weather event. The subset of properties identified above may be further reduced to only those properties within the footprint of the event. The aggregate of the values of those properties can be used to derive a potential risk for an insurance company. Investment decisions can then be made with regards to traded securities for that company. For example, if a category 5 hurricane is about to destroy an area and a company has a large number of properties in that area, it will have to cover those losses. The value of the company as it draws down on its liquid reserves will be lessened. It would be advantageous to an investor to sell off securities prior to the loss. These operations provide that investor the ability to determine risks to individual companies due to weather.

In an alternate embodiment, the aggregate values may be aggregated across all of the properties in the image. Using those aggregated values, a risk multiplier may be derived and when future premiums are quoted for that area, the risk multiplier may be used. This may be used to show the relative value of all properties in the area and determining if the value of an individual property is out of a normal distribution, in one example.

The operations described above relate to securities associated with insurance companies. However, the operations have similar applicability to other companies and industries. By using aggregate over the entirety of a footprint of an event, the impact of the event on other companies could be measured. In one example, securities in construction related companies could be traded in anticipation of larger demand. Trading in commodities futures, such as farm product, could also benefit from a true representation of the impact of an impending weather event. For instance, operating on a weather forecast that predicts a weather cell will traverse a large citrus crop, a commodities trader may buy commodities in citrus as they are expecting a shortage. In all of these examples, the trader operating on this information would be able to trade earlier than a trader who does not have access to this information.

Figure 5B:
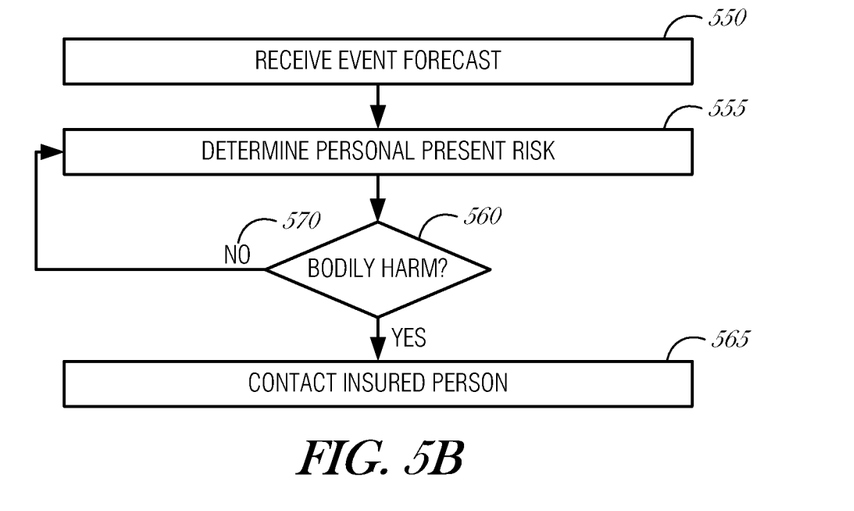
FIG. 5B shows a flowchart of a method of providing individualized threat analysis, in accordance with an example embodiment.

FIG. 5B shows a flowchart of a method of providing individualized threat analysis, in accordance with an example embodiment. The operations depicted in FIG. 5B may be carried out, in one embodiment, partly by systems described above with respect to FIG. 2A.

At block 550, an event forecast is received. This event may include, without limitation, a weather event, a terrorist event, an industrial accident, military invasion and the like. Each of these types of events presents differing hazards to an insured person in an area affected by them. Specific reference may be made herein to weather events, though the operations described herein have equal applicability to the other event types.

At block 555, a present risk to an insured person is determined using the forecast received at block 550 and risk information for the property in which the insured person resides. The risk information can be a representation of the damage that could occur during the event to the property. This damage may lead to bodily harm for the insured. At block 560, a determination of whether there is a risk of bodily harm is performed. If there is a risk of bodily harm, then at block 565 an insured person is contacted. If there is no risk of bodily harm, then at 570, risk information is evaluated again at block 555.

Bodily harm could be caused by high winds uprooting trees during a storm with those trees falling on the house. It may also include the risk to flooding, either from a river flooding, or a storm surge leading a hurricane. Non-weather events have unique damage possibilities, as well. For instance, a terrorist event may involve the release of a chemical agent, which could contaminate the air within a property. However, some properties may have specific systems installed that prevent unfiltered air from reaching the interior. The possible bodily harm to an individual may take such information into account. Combining specific information about the event (wind speed, and expected storm surge, for example), with specific information about the structure in which the insured resides (hurricane straps for the roof or the composition of the walls, for example) results in a very targeted risk profile for the insured.

By contrast, general warnings for a community preceding a large weather event, for example, do not take into account individuals. In the cases of catastrophic weather where emergency services are evacuated, this is slightly less useful, but in cases where individuals are advised to leave, a system like this which results in an individualized warning for an insured would provide more specific information to act on.

Reference has been made to weather events though the operations described here have equal applicability to any event that may impact an insured property. As discussed above, this may include a terrorist event, an industrial accident, a military invasion, and the like. Each of these events may present specific threats to a property and to an insured, but the overall operations are very similar. With respect to a terrorist event, which is very dynamic, forecasting the aftermath of the event would provide similar risk information to a weather event. Such aftermath may include, chemical plume following a release, radioactive plume, and the like. Similarly, industrial accidents and military invasions can be processed.

Figure 6:
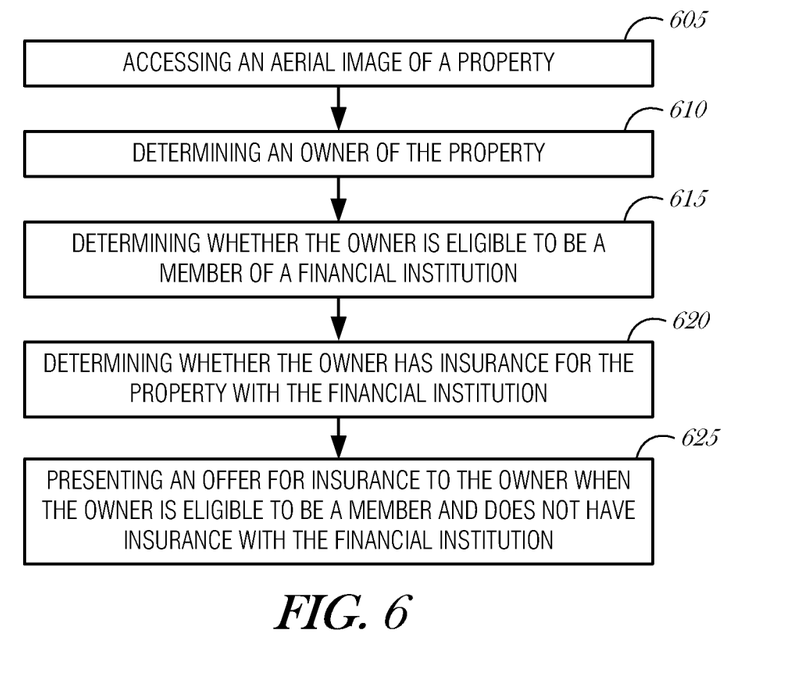
FIG. 6 shows a flowchart of a method of offering property insurance, in accordance with an example embodiment.

FIG. 6 shows a flowchart of a method of offering property insurance, in accordance with an example embodiment. At block 605, an aerial image of a property is accessed. As discussed above, images may be obtained using various mechanisms, including aircraft (manned or unmanned), satellite imagery, balloons, blimps, rockets, kites, or pole-mounted cameras. The images may be stored in a database of images for various uses, including analysis or historical reference.

Thus, in a further embodiment, the method in FIG. 6 includes obtaining the aerial image by deploying an unmanned aerial vehicle to the property, and obtaining a digital image of the property.

In a further embodiment, the method of FIG. 6 includes obtaining the aerial image by processing a video of the property. For example, an unmanned aerial vehicle may be used to fly a survey route over a section of a city, recording video of the entire route. One or more frames of the video may be used to generate an image. Using the video to obtain images may be advantageous because a particular property may be captured from several angles as the aerial vehicle is flying past, resulting in several images to use when attempting to identify the property or the property owner. Thus, in another embodiment, deploying the unmanned aerial vehicle to the property is performed by deploying the unmanned aerial vehicle to survey a plurality of properties that include the property.

In another example, the survey may be performed as the unmanned aerial vehicle is heading out to or returning from another service call, thereby optimizing flight time by surveying properties that the aerial vehicle would have been flying over anyway. In some instances, slight variations in the flight path may be used to achieve the dual objectives of performing the primary task and surveying properties proximate to the flight path on the way to the location of the primary task. For example, the primary task may be to survey the roof of a house for an insurance adjustment operation. On the way to the house, or while the aerial vehicle is at the house, other properties on the flight path or nearby the destination house may be recorded on video for later analysis. Still imagery may also be used in this context, for example, with a camera set to capture an image at a regular interval, such as every second.

At block 610, an owner of the property is determined. Image analysis may include character recognition, facial recognition, map correlation or geographic feature analysis. Using such analysis, the property may be identified. For example, when the property is a residential property, a property address may be obtained by correlating the image with a known map and determining a relative position of the property in question. As another example, a house number, street number, signposts, mile marker, or other identifying indicia may be used to identify the property. As yet another example, a person captured in the image may be analyzed, such as by facial recognition, to determine or verify the property identification.

Once the property is reliably identified, an owner may be determined through the use of private or public records. For example, when the property in question is a residential property, various tax records, title records, real estate listings, insurance databases, or other databases may be accessed to determine the legal owner of the property.

In another example, the property may be a vehicle. In such an instance, the property insurance refers to an automobile insurance policy. In this instance, determining the owner of the vehicle may be performed by identifying a vehicle identifier from the aerial image and accessing a vehicle database to determine the owner of the vehicle. The vehicle identifier may be a vehicle license plate number or a vehicle identification number, in various examples. Obtaining the vehicle license plate number may be performed by character recognition image analysis.

At block 615, it is determined whether the owner of the property is eligible to be a member of a financial institution. Some financial institutions restrict membership based on a person's characteristics, employment, family situation, or other personal data. For example, a credit union may limit membership to people who are Wisconsin residents or who work for a particular employer. As another example, an integrated financial company may limit membership to members of the military and their immediate family.

Once the owner is identified, as described with reference to block 610, the owner's personal data may be accessed from various databases. For example, to determine an owner's name, county property tax records may be accessed. Using this information, a governmental income tax database may be accessed to determine the owner's employer or state of employment. As another example, military membership may be determined by accessing databases of the Department of Defense, such as the Defense Enrollment Eligibility Reporting System (DEERS).

Personal data may also be obtained from one or more private databases. For example, the owner may be a current or previous member of or applicant to the financial institution. In this instance, the owner may already exist in one or more databases within the financial institution. If the owner is not a current member of the financial institution, the information in the databases may be used, at least in part, to determine whether the owner is eligible to become a member, as the owner's personal situation may have changed from the time when the owner was an applicant or member.

At block 620, it is determined whether the owner of the property has property insurance with the financial institution for the property type of the property in the aerial image. If the owner of the property is not a member of the financial institution, then the query is straight forward and the result negative. However, if the owner is either a prior or existing member, then the owner may already have property insurance for the type of property being analyzed in the image. In this case, offering a new policy may not be necessary. However, in some cases, a present member may be offered a renewal policy to update an existing policy's parameters. The renewal may provide better coverage, reduced cost, or both. Thus, while the embodiment, described in FIG. 6 refers to offering property insurance to a property owner that does not have property insurance with the financial institution, it is understood that alternative embodiments exist where a renewal policy, adjusted existing policy, a rider to an existing policy, or other policy changes may be offered to an existing member with an existing policy.

At block 625, an offer for property insurance to insure the property in the aerial image is offered to the owner when the owner is determined to be eligible for the financial institution and when the owner does not have property insurance with the financial institution.

In an example, the owner has a preexisting relationship with the financial institution. In such an example, the owner may be presented the offer for property insurance on a financial statement from the financial institution. For example, the financial institution may be a comprehensive financial institution offering both banking and insurance products. The owner may be a customer of the banking arm of the financial institution; receiving monthly statements on one or more accounts with the bank. Thus, in an embodiment, the owner/customer may be offered an insurance product on a monthly banking statement. In addition, the owner may be contacted in other ways, such as by contacting the owner by telephone, emailing the owner, using text messaging, or postal mail.

Figure 7:
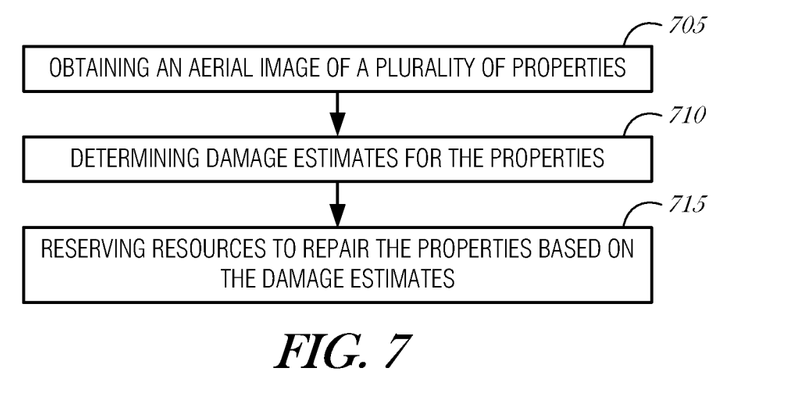
FIG. 7 shows a flowchart of a method of reserving resources to repair damaged properties, in accordance with an example embodiment.

FIG. 7 shows a flowchart of a method of reserving resources to repair damaged properties, in accordance with an example embodiment. Properties may be damaged in a roughly localized region due to different hazards, such as by weather hazards, man-made disasters, or acts of God. When such an event occurs, multiple properties may be damaged. Using aerial imagery to evaluate property damage may be used to perform an initial triage of the situation. Thus, at block 705, an aerial image of a plurality of properties is obtained. In an example, the aerial image is obtained by an unmanned aerial vehicle. As discussed above with respect to FIG. 6, aerial imagery of several properties may be obtained during a survey, a fly over, or while an aerial vehicle is on-site during a task. In this instance, the effective area of a task may be measured in miles, for example, in the case of a hurricane damaging a coastline.

At block 710, a plurality of damage estimates for the plurality of properties are determined. Image analysis may be used to detect damage to roofs, chimneys, walls, collapsed structures, overturned vehicles, missing structures, landscaping, or other damage. In an example, a human adjuster reviews video or images of an event area to determine damage estimates. The human adjuster may work in conjunction with automated computer analysis to expedite analysis.

In an example, the damage estimates are determined by correlating the aerial image with a land map, parsing the plurality of properties into individual properties, and determining damage to a particular one of the individual properties of the plurality of properties by analyzing an earlier image of the particular one of the individual properties in comparison to the aerial image containing the present condition of the individual one of the particular properties. This type of analysis may provide an indication of missing structures, for example, a garage that was destroyed and removed by a tornado. This type of analysis may also provide information to detect damaged portions of a property, such as a partially damage roof or a collapsed wall.

At block 715, resources to repair the plurality of properties based on the plurality of damage estimates are reserved. In an example, reserving resources is performed by calculating an amount of materials needed to perform repairs according to the plurality of damage estimates for the plurality of properties, and pre-ordering the amount of materials. A database of repairs with materials commonly needed for such repairs may be referenced to determine the amount of materials needed to perform such repairs. Housing specifications, which may have been provided as part of an underwriting activity, may be referenced to determine types of exterior (e.g., cedar siding, cement siding, or stucco), type of roofing material (e.g., asphalt shingles, wood shingles, slate tiles or shingles, clay tiles, sheet metal, or concrete), style of roof, window types and numbers, driveway material (e.g., concrete or asphalt), general housing construction (e.g., wood frame, steel framed, concrete home, log home, modular home, or a specialty home, such as a geodesic dome or a yurt). Using publicly available and privately accessible information, a more accurate repair cost estimate may be determined.

In another example, reserving resources is performed by advertising a work contract based on a damage estimate corresponding to the particular one of the individual properties, and offering the work contract to a contractor. The work contract may be offered to the contractor who wins a reverse auction.

By pre-ordering materials (e.g., ordering materials before a bid is selected and a contract is made) and advertising work contracts, the amount of time needed to recover from a disaster is reduced. The information collected and estimated calculated may be shared among one or more other financial institutions (e.g., insurance companies) to provide a commonly accessible area to organize recovery efforts.

Figure 8:
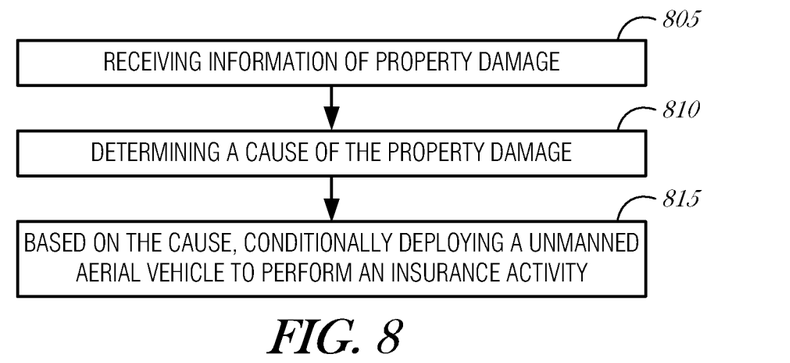
FIG. 8 shows a flowchart of a method of conditionally deploying an unmanned aerial vehicle, in accordance with an example embodiment.

FIG. 8 shows a flowchart of a method of conditionally deploying an unmanned aerial vehicle, in accordance with an example embodiment. At block 805, information describing property damage to an insured property is received.

The information may be received from a homeowner, a witness, or another authority, such as a police officer.

At block 810, a cause of the property damage is determined. In some cases, the cause of the property damage renders the insured property unsafe or inaccessible to a human adjuster. In these such cases, deploying an unmanned aerial vehicle to perform adjustment activities is safer. For example, the information of the property damage may indicate that a structure is unstable due to a damaged wall or a missing portion of a roof. Thus, at block 815, based on the cause of the property damage, an unmanned aerial vehicle is conditionally deployed to perform insurance adjustment activities with regard to the insured property.

In an example, the insurance adjustment activities comprise analyzing an interior of the insured property. The interior may be examined directly, such as by flying within the interior of the structure, or indirectly, such as by using infrared imaging (e.g., night vision cameras or thermal imaging), x-ray, or penetrating radar.

In a further embodiment, based on the cause of the property damage, the unmanned aerial vehicle is conditionally deployed to a property in proximity to the insured property to perform an insurance-related activity. For example, when damage to the property is of the type that may be due to a localized disaster, such as a tornado, it is understood that nearby properties may also be affected.

Thus, in an example, the cause of the property damage includes a wide-area event. Examples of wide-area events include a weather event (e.g., a flood due to rain, hail storm, tornado, or blizzard), a man-made event (e.g., arson, nuclear reactor failure, or a chemical spill due to a train derailment), or other catastrophes (e.g., an earthquake, typhoon, volcano, or tsunami).

In such a wide-area event, properties that may be insured by the financial institution may also be affected. Thus, in a further embodiment, the insurance-related activity includes performing an insurance adjustment to the property in proximity to the insured property. It is possible to perform insurance adjustment like activities for properties that are not insured by the financial institution. In this case, the data collected may be forwarded to an appropriate insurance company, the respective property owner, or another authority to act upon.

In any of the operations described in these examples, the aerial image source may be operated remotely by a human operator or may be programmed to automatically operate. Human operators may be on-site or in a remote operating environment. For example, a human operator may be given access to an unmanned aerial vehicle to use as may be needed for conducting inspections for insurance estimates, insurance adjustments, auditing, or marketing activities. In the case of an insurance adjustment, a human adjuster may inspect the interior of a home and then operate an unmanned aerial vehicle to inspect the exterior of the home. Data from such inspections may be downloaded to a local data repository (e.g., the operator's laptop computer or mobile device) or may be transmitted to a central repository (e.g., the insurance company's database).

Figure 9:
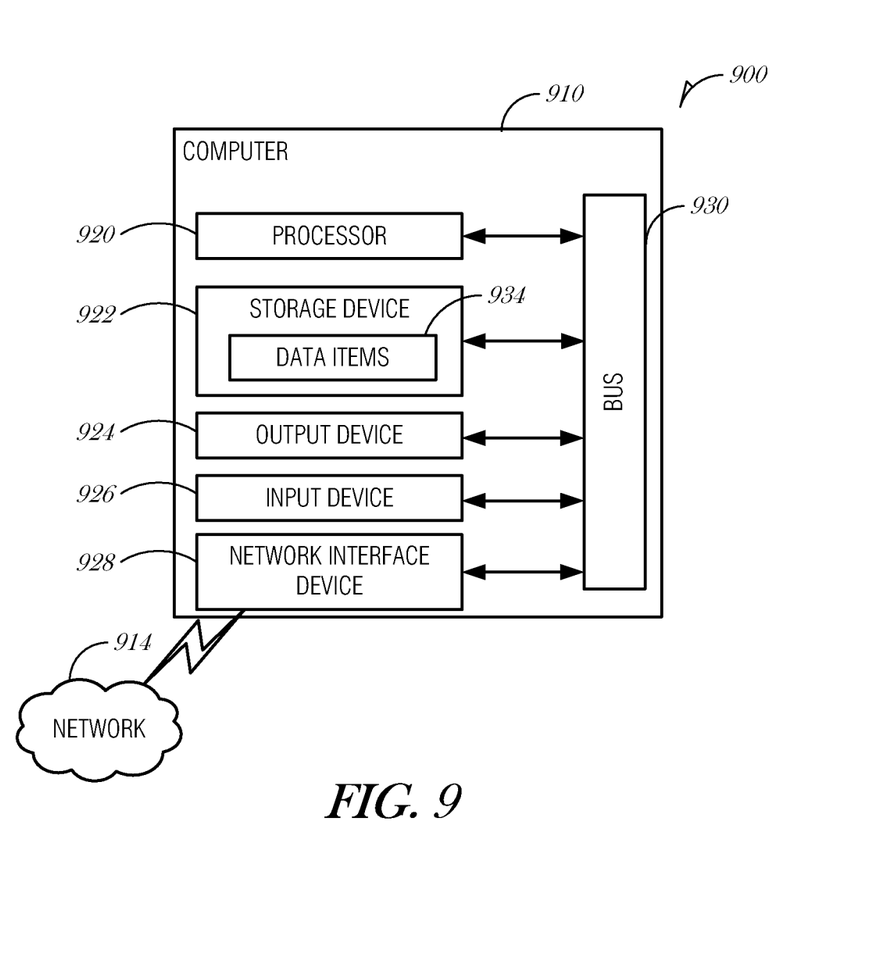
FIG. 9 shows a block diagram of a machine including instructions to perform any one or more of the methodologies described herein.

FIG. 9 shows a block diagram of a machine including instructions to perform any one or more of the methodologies described herein. A system 900 includes a computer 910 connected to a network 914. The computer 910 includes a processor 920, a storage device 922, an output device 924, an input device 926, and a network interface device 928, all connected via a bus 930. The processor 920 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 920 executes instructions and includes that portion of the computer 910 that controls the operation of the entire computer. Although not depicted in FIG. 9, the processor 920 typically includes a control unit that organizes data and program storage in memory and transfers data and other information between the various parts of the computer 910. The processor 920 receives input data from the input device 926 and the network 914, reads and stores code and data 934 in the storage device 922, and presents data to the output device 924.

Although the computer 910 is shown to contain only a single processor 920 and a single bus 930, the disclosed embodiment applies equally to computers that may have multiple processors and to computers that may have multiple busses with some or all performing different functions in different ways.

The storage device 922 represents one or more mechanisms for storing data. For example, the storage device 922 may include read-only memory (ROM), random access memory (RAM), magnetic disk storage media, optical storage media, flash memory devices, and/or other non-transitory machine-readable media. In other embodiments, any appropriate type of storage device may be used. Although only one storage device 922 is shown, multiple storage devices and multiple types of storage devices may be present. Further, although the computer 910 is drawn to contain the storage device 922, it may be distributed across other computers, for example on a server.

The storage device 922 includes a controller (not shown in FIG. 9) and data items 934. The controller includes instructions capable of being executed on the processor 920 to carry out the functions, as previously described above with reference to FIGS. 1-8. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 922 may also contain additional software and data (not shown), which is not necessary to understand the invention.

Although the controller and the data items 934 are shown to be within the storage device 922 in the computer 910, some or all of them may be distributed across other systems, for example on a server and accessed via the network 914.

The output device 924 is that part of the computer 910 that displays output to the user. The output device 924 may be a liquid crystal display (LCD) well-known in the art of computer hardware. But, in other embodiments the output device 924 may be replaced with a gas or plasma-based flat-panel display or a traditional cathode-ray tube (CRT) display. In still other embodiments, any appropriate display device may be used. Although only one output device 924 is shown, in other embodiments any number of output devices of different types, or of the same type, may be present. In an embodiment, the output device 924 displays a user interface.

The input device 926 may be a keyboard, mouse or other pointing device, trackball, touchpad, touch screen, keypad, microphone, voice recognition device, or any other appropriate mechanism for the user to input data to the computer 910 and manipulate the user interface previously discussed. Although only one input device 926 is shown, in another embodiment any number and type of input devices may be present.

The network interface device 928 provides connectivity from the computer 910 to the network 914 through any suitable communications protocol. The network interface device 928 sends and receives data items from the network 914.

The bus 930 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 910 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 910. For example, other peripheral devices such as audio adapters or chip programming devices, such as EPROM (Erasable Programmable Read-Only Memory) programming devices may be used in addition to, or in place of, the hardware already depicted.

The network 914 may be any suitable network and may support any appropriate protocol suitable for communication to the computer 910. In an embodiment, the network 914 may support wireless communications. In another embodiment, the network 914 may support hard-wired communications, such as a telephone line or cable. In another embodiment, the network 914 may support the Ethernet IEEE (Institute of Electrical and Electronics Engineers) 802.3x specification. In another embodiment, the network 914 may be the Internet and may support IP (Internet Protocol). In another embodiment, the network 914 may be a local area network (LAN) or a wide area network (WAN). In another embodiment, the network 914 may be a hotspot service provider network. In another embodiment, the network 914 may be an intranet. In another embodiment, the network 914 may be a GPRS (General Packet Radio Service) network. In another embodiment, the network 914 may be any appropriate cellular data network or cell-based radio network technology. In another embodiment, the network 914 may be an IEEE 802.11 wireless network. In still another embodiment, the network 914 may be any suitable network or combination of networks. Although one network 914 is shown, in other embodiments any number of networks (of the same or different types) may be present.

The embodiments described herein may be implemented in an operating environment comprising software installed on any programmable device, in hardware, or in a combination of software and hardware.

For the purposes of this specification, the terms "machine-readable medium" or "computer-readable medium" shall be taken to include any tangible non-transitory medium which is capable of storing or encoding a sequence of instructions for execution by the machine and that cause the machine to perform any one of the methodologies described herein. The terms "machine-readable medium" or "computer-readable medium" shall accordingly be taken to include, but not be limited to, solid-state memories, and optical or magnetic disks. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM's), read only memories (ROM's), and the like.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. For example, one module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

The description includes references to the accompanying drawings, which form a part of the Detailed Description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

As used throughout this application, the word "may" is used in a permissive sense (e.g., meaning having the potential to), rather than the mandatory sense (e.g., meaning must). Similarly, the words "include", "including", and "includes" mean including but not limited to. To facilitate understanding, like reference numerals have been used, where possible, to designate like elements common to the figures.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   receiving a notification of an event that poses a risk to a property;
   deploying, based on the notification, a vehicle to the property;
   generating, by penetrating radar of the vehicle, data associated with the property; and
   determining, based on the generated data and data from an aerial vehicle, an amount of damage to the property.

2. The method of claim 1, wherein the damage to the property is caused by weather.

3. The method of claim 1, wherein deploying the vehicle to the property is based on determining a hazard or obstruction to a human at the property.

4. The method of claim 1, further comprising determining repairs to perform to the property.

5. The method of claim 4, further comprising determining a physical material to perform the repairs to the property.

6. The method of claim 1, wherein the aerial vehicle comprises at least one of a satellite, an aircraft, a blimp, a balloon, a rocket, a kite, or a pole-mounted camera.

7. The method of claim 1, wherein the aerial vehicle comprises an unmanned vehicle.

\* \* \* \* \*